(12) United States Patent  (10) Patent No.: US 11,830,216 B2
Kotake et al.  (45) Date of Patent: Nov. 28, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Daisuke Kotake, Yokohama (JP); Akihiro Katayama, Tokyo (JP); Makoto Tomioka, Kawasaki (JP); Nozomu Kasuya, Yokohama (JP); Takayuki Yamada, Kawasaki (JP); Masahiro Suzuki, Kawasaki (JP); Masakazu Fujiki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 17/228,824

(22) Filed: Apr. 13, 2021

(65) Prior Publication Data

US 2021/0232845 A1   Jul. 29, 2021

Related U.S. Application Data

(63) Continuation of application No. 16/451,361, filed on Jun. 25, 2019, now Pat. No. 11,003,939.

(30) Foreign Application Priority Data

Jul. 6, 2018   (JP) .............. JP2018-129457
Jun. 20, 2019  (JP) .............. JP2019-114936

(51) Int. Cl.
*G06V 10/24*   (2022.01)
*G06T 7/73*    (2017.01)
*G06V 20/20*   (2022.01)

(52) U.S. Cl.
CPC .............. *G06T 7/73* (2017.01); *G06V 10/242* (2022.01); *G06V 20/20* (2022.01); *G06V 10/245* (2022.01)

(58) Field of Classification Search
CPC .... G06V 10/242; G06V 10/245; G06V 20/20; G06T 7/73

(Continued)

(56) References Cited

U.S. PATENT DOCUMENTS 7,529,387 B2   5/2009  Kotake et al.
9,053,536 B2   6/2015  Imamura et al.

(Continued)

FOREIGN PATENT DOCUMENTS

JP   2009193240 A   8/2009
JP      4532982 B    8/2010

(Continued)

OTHER PUBLICATIONS

Z. Dong, G. Zhang, J. Jia, and H. Bao, "Keyframe-Based Real-Time Camera Tracking", Proc. 2009 IEEE 12th International Conference on Computer Vision (ICCV), pp. 1538-1545, 2009.

(Continued)

*Primary Examiner* — Juan A Torres
(74) *Attorney, Agent, or Firm* — Carter, DeLuca & Farrell LLP

(57) ABSTRACT

There is provided with an information processing apparatus. From an image capturing apparatus which can move, a captured image of an object is obtained. The position of the image capturing apparatus is derived using the captured image and a three-dimensional map. The three-dimensional map is corrected using information indicating a reliability of: information indicating the three-dimensional position of the feature included in a predefined area in the three-dimensional map held by the holding unit; and information (Continued)

indicating a three-dimensional position of another feature of the object, the information obtained based on the captured image from an expanded area of the predefined area in the three-dimensional map held by the holding unit.

17 Claims, 5 Drawing Sheets

(58) Field of Classification Search
USPC .......................................................... 382/286
See application file for complete search history.

(56) References Cited

U.S. PATENT DOCUMENTS

| | | | |
|---|---|---|---|
| 9,621,793 B2 | 4/2017 | Furihata et al. | |
| 9,943,961 B2 | 4/2018 | Nakazato et al. | |
| 10,059,002 B2 | 8/2018 | Miyatani et al. | |
| 10,171,730 B2 | 1/2019 | Kobayashi et al. | |
| 10,297,352 B2 | 5/2019 | Sakagawa et al. | |
| 10,304,206 B2 | 5/2019 | Nakazato et al. | |
| 10,497,111 B2 | 12/2019 | Hirota et al. | |
| 10,529,045 B2 | 1/2020 | Iwase et al. | |
| 10,603,791 B2 | 3/2020 | Nakazato et al. | |
| 10,643,347 B2 | 5/2020 | Kotake | |
| 10,939,081 B2 | 3/2021 | Miyatani et al. | |
| 2001/0037191 A1* | 11/2001 | Furuta | G16H 30/40 703/6 |
| 2013/0147789 A1 | 6/2013 | Kim | |
| 2014/0002597 A1 | 1/2014 | Taguchi et al. | |
| 2016/0260027 A1 | 9/2016 | Kuwabara et al. | |
| 2017/0039718 A1* | 2/2017 | Kotake | G06T 7/73 |
| 2017/0148167 A1* | 5/2017 | Aratani | G06T 7/60 |
| 2017/0249752 A1* | 8/2017 | Kotake | G06T 7/73 |
| 2017/0372466 A1 | 12/2017 | Hirota et al. | |
| 2019/0130216 A1 | 5/2019 | Tomioka et al. | |
| 2019/0371001 A1 | 12/2019 | Kobayashi et al. | |
| 2020/0143603 A1 | 5/2020 | Kotake et al. | |

FOREIGN PATENT DOCUMENTS

| | | | | |
|---|---|---|---|---|
| JP | 2012-103115 A | | 5/2012 | |
| JP | 2012103115 A | * | 5/2012 | |
| JP | 2017-156162 A | | 9/2017 | |
| JP | 2017156162 A | * | 9/2017 | G06T 7/73 |
| JP | 2018-055167 A | | 4/2018 | |
| JP | 2018055167 A | * | 4/2018 | |

OTHER PUBLICATIONS

C. Forster, M. Pizzoli, and D. Scaramuzza, "SVO: Fast Semi-Direct Monocular Visual Odometry," Proc. 2014 IEEE International Conference on Robotics and Automation (ICRA), pp. 15-22, 2014.

Z. Zhang, "A Flexible New Technique for Camera Calibration," IEEE Trans. on Pattern Analysis and Machine Intelligence, vol. 22, No. 11, pp. 1330-1334, 2000.

J. Engel, T. Schöps, and. D. Cremers, "LSD-SLAM: Large-Scale Direct Monocular SLAM," Proc. 14th European Conference on Computer Vision (ECCV), pp. 834-849, 2014.

G. Klein and D. Murray, "Parallel Tracking and Mapping for Small AR Workspaces," Proc. 6th IEEE and ACM International Symposium on Mixed and Augmented Reality, pp. 225-234, 2007.

I. Gordon and D. G. Lowe, "Scene Modelling, Recognition and Tracking with Invariant Image Features," Proc. 3rd IEEE and ACM International Symposium on Mixed and Augmented Reality (ISMAR), pp. 110-119, 2004.

H. Kato, M. Billinghurst, I. Poupyrev, K. Imamoto, and K. Tachibana, "Virtual Object Manipulation on a Table-Top AR Environment," Proc. IEEE and ACM International Symposium on Augmented Reality 2000, pp. 111-119, 2000.

Notice of Reasons for Refusal issued by the Japanese Patent Office dated Jun. 5, 2023 in corresponding JP Patent Application No. 2021-055837, with English translation.

Jchiyama, H., "Technical Trends of Visual SLAM" Image Laboratory (2017) pp. 34-42, vol. 28, Issue 6, English abstract.

Yokozuka, M., "Realtime 3D Slam for a sparse multi-layered LiDAR without other sensor" SSII2018 The 24th Symposium on Sensing via Image Information (2018) pp. 1-4, English abstract.

* cited by examiner

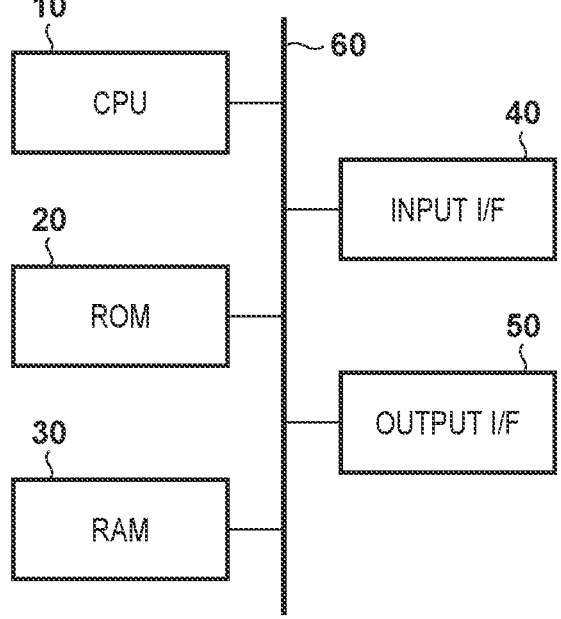
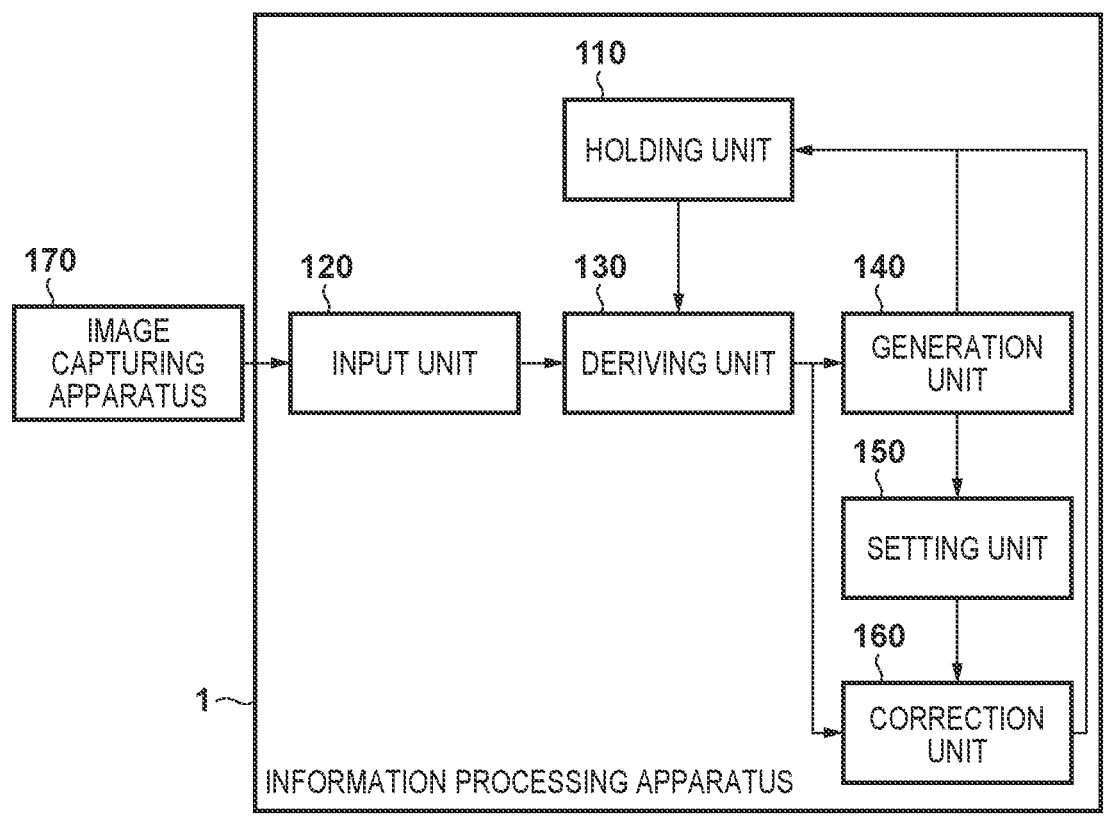

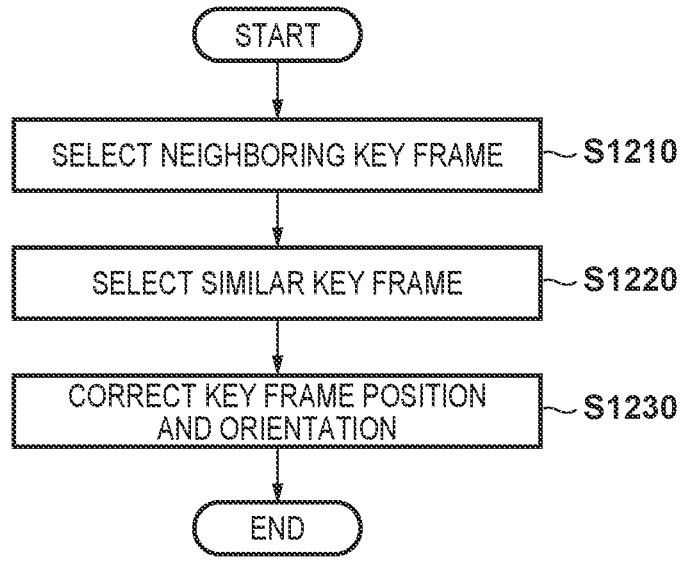
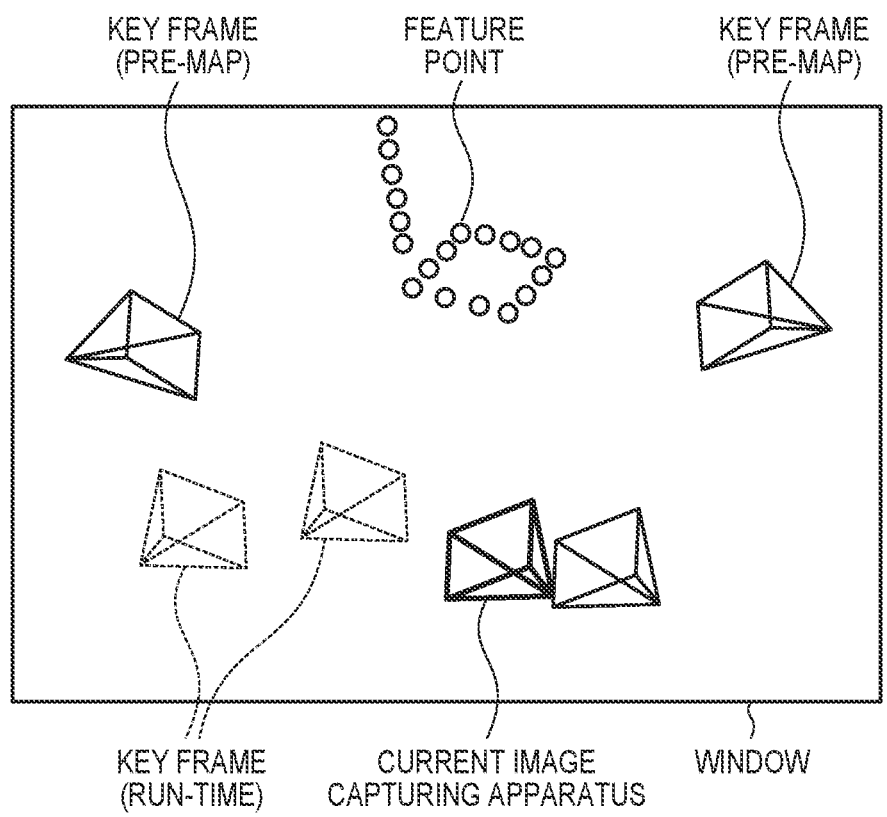

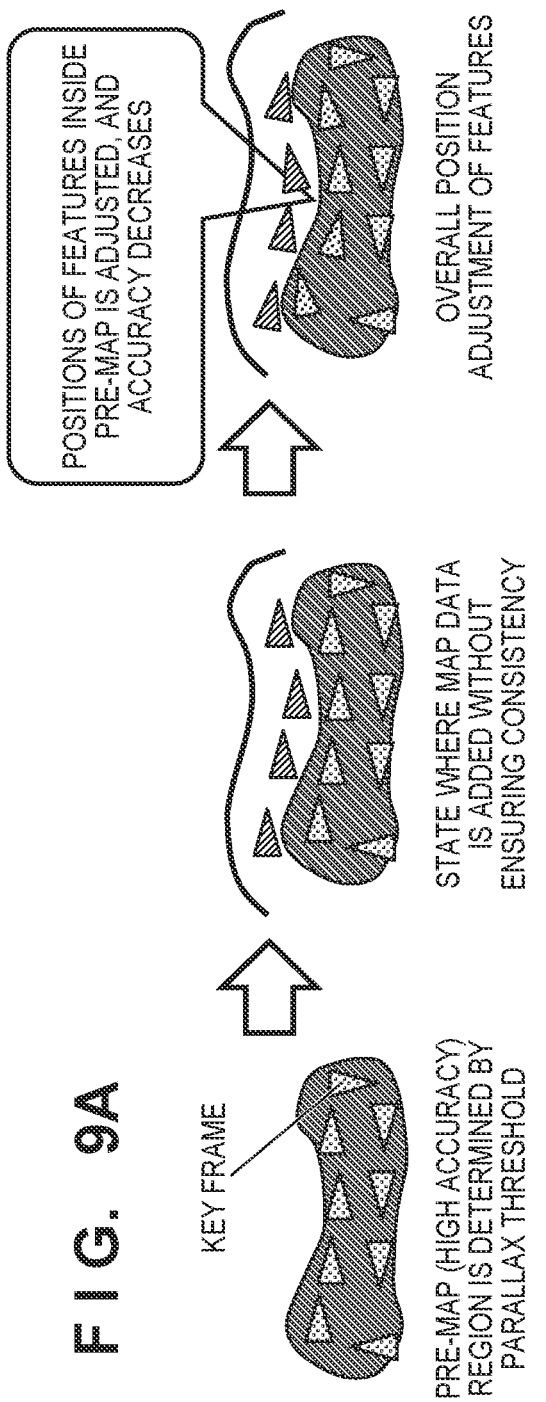
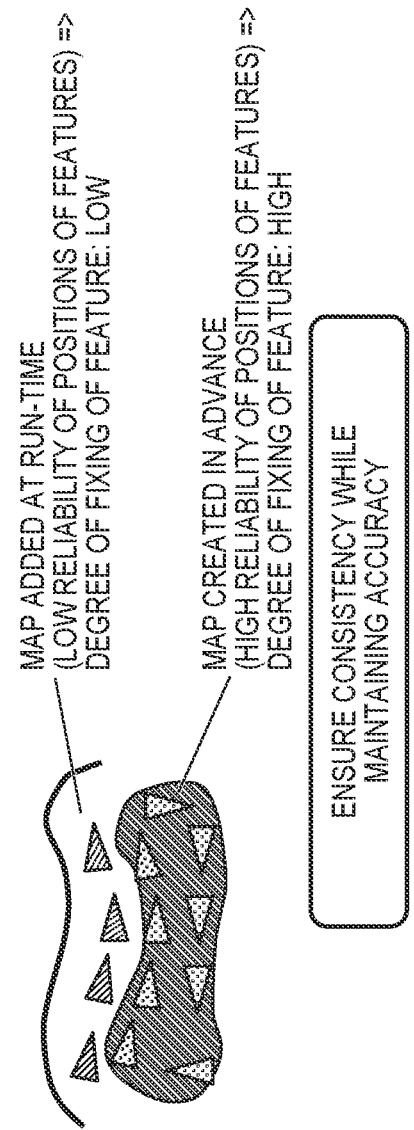

INFORMATION PROCESSING APPARATUS, INFORMATION PROCESSING METHOD, AND STORAGE MEDIUM

CROSS REFERENCE TO RELATED APPLICATIONS

This application is a continuation of U.S. patent application Ser. No. 16/451,361, filed on Jun. 25, 2019, which claims the benefit of and priority to Japanese Patent Application Nos. 2018-129457 and 2019-114936, filed on Jul. 6, 2018 and Jun. 20, 2019, respectively, each of which is hereby incorporated by reference herein in their entirety.

BACKGROUND OF THE INVENTION

Field of the Invention

The present invention relates to the information processing apparatus, an information processing method, and a storage medium.

Description of the Related Art

The measurement of the position and orientation of an image capturing apparatus based on an image is used for various objectives. Examples of objectives include alignment of a virtual object with a real space in a mixed reality (MR) technology or an augmented reality (AR) technology. Another example of an objective is self-position estimation for autonomous movement of a robot or automatic driving of a vehicle.

Dong (Z. Dong, G. Zhang, J. Jia, and H. Bao, "Key frame-based real-time camera tracking", Proc. 2009 IEEE 12th International Conference on Computer Vision (ICCV), pp. 1538-1545, 2009.) discloses a method of measuring the position and orientation of an image capturing apparatus using feature points detected from an image. In this method, the three-dimensional coordinates of feature points in the scene are measured with high accuracy by a "structure from motion" technique in advance, and this information is stored as a three-dimensional map. At run time, a feature point on the captured image corresponding to the feature point in the three-dimensional map is searched for, and the position and orientation of the image capturing apparatus is calculated based on the correspondence between the image coordinates of the feature point and the three-dimensional coordinates.

SUMMARY OF THE INVENTION

According to an embodiment of the present invention, an information processing apparatus comprises: an obtaining unit configured to obtain, from an image capturing apparatus which can move, a captured image of an object; a holding unit configured to hold a three-dimensional map containing information indicating a three-dimensional position of a feature of the object; a deriving unit configured to derive the position of the image capturing apparatus using the captured image and the three-dimensional map, a correction unit configured to correct the three-dimensional map using information indicating a reliability of: information indicating the three-dimensional position of the feature included in a predefined area in the three-dimensional map held by the holding unit; and information indicating a three-dimensional position of another feature of the object, the information obtained based on the captured image from an expanded area of the predefined area in the three-dimensional map held by the holding unit.

According to another embodiment of the present invention, an information processing apparatus comprises: a holding unit configured to hold a three-dimensional map including, for each viewpoint out of a plurality of viewpoints, information indicating a three-dimensional position of an object with respect to the viewpoint, and position and orientation information of the viewpoint; an obtaining unit configured to obtain, from an image capturing apparatus which can move, a captured image of the object from a new viewpoint; a deriving unit configured to derive a position and orientation of the new viewpoint using the captured image and the three-dimensional map; a correction unit configured to correct the three-dimensional map using information indicating a reliability of: position and orientation information of the new viewpoint, which is obtained based on the captured image from an expanded area of a predefined area in the three-dimensional map held by the holding unit; and position and orientation information of a viewpoint included in the predefined area in the three-dimensional map.

According to still another embodiment of the present invention, an information processing apparatus comprises: an obtaining unit configured to obtain, from an image capturing apparatus, a captured image of an object; a holding unit configured to hold a pre-generated pre-map and a temporary map, wherein the pre-map includes information indicating a three-dimensional position of a feature of the object, and the temporary map is generated on the basis of the captured image; a deriving unit configured to derive a position and orientation of the image capturing apparatus using the captured image, and the pre-map or the temporary map; and a generation unit configured to generate, based on the captured image and the position and orientation of the image capturing apparatus, the temporary map which includes the information indicating the three-dimensional position of the feature of the object.

According to yet another embodiment of the present invention, an information processing apparatus comprising: an obtaining unit configured to obtain, from an image capturing apparatus, a captured image of an object; a holding unit configured to hold a three-dimensional map containing information indicating a three-dimensional position of a feature of the object; a deriving unit configured to derive a position and orientation of the image capturing apparatus using the captured image and the three-dimensional map; a generation unit configured to, based on the captured image and the position and orientation of the image capturing apparatus, add information indicating the three-dimensional position of the feature of the object to the three-dimensional map; and a correction unit configured to correct the three-dimensional map while fixing information indicating a three-dimensional position of a feature included in a predefined area in the three-dimensional map.

According to still yet another embodiment of the present invention, an information processing apparatus comprises: an obtaining unit configured to obtain, from an image capturing apparatus, a captured image of an object; a holding unit configured to hold a three-dimensional map containing information indicating a three-dimensional position of a feature of the object, a deriving unit configured to derive a position and orientation of the image capturing apparatus using the captured image and the three-dimensional map; a correction unit configured to correct the three-dimensional map while fixing information indicating the three-dimensional position of the feature generated based on an assistance marker, wherein the assistance marker is arranged in a space in which the object is positioned, for measuring the position and orientation of the image capturing apparatus based on the captured image.

According to yet still another embodiment of the present invention, an information processing method comprises: obtaining, from an image capturing apparatus which can move, a captured image of an object; deriving the position of the image capturing apparatus using the captured image and a three-dimensional map, wherein the three-dimensional map contains information indicating a three-dimensional position of a feature of the object, correcting the three-dimensional map using information indicating a reliability of: information indicating the three-dimensional position of the feature included in a predefined area in the three-dimensional map; and information indicating a three-dimensional position of another feature of the object, the information obtained based on the captured image from an expanded area of the predefined area in the three-dimensional map.

According to still yet another embodiment of the present invention, a non-transitory computer-readable medium storing a program which, when executed by a computer comprising a processor and a memory, causes the computer to perform: obtaining, from an image capturing apparatus which can move, a captured image of an object; deriving the position of the image capturing apparatus using the captured image and a three-dimensional map, wherein the three-dimensional map contains information indicating a three-dimensional position of a feature of the object, correcting the three-dimensional map using information indicating a reliability of: information indicating the three-dimensional position of the feature included in a predefined area in the three-dimensional map; and information indicating a three-dimensional position of another feature of the object, the information obtained based on the captured image from an expanded area of the predefined area in the three-dimensional map.

Further features of the present invention will become apparent from the following description of exemplary embodiments (with reference to the attached drawings).

BRIEF DESCRIPTION OF THE DRAWINGS

FIG. 1 is a diagram illustrating an exemplary hardware configuration of an information processing apparatus according to an embodiment.

FIG. 2 is a diagram showing an example of a functional configuration of an information processing apparatus 1 according to an embodiment.

FIG. 5 is an example of a flowchart of three-dimensional map correction processing.

FIG. 6 is a diagram illustrating an example of a graphical user interface according to an embodiment.

FIGS. 9A and 9B are conceptual diagrams of one embodiment.

DESCRIPTION OF THE EMBODIMENTS

Figure 3:
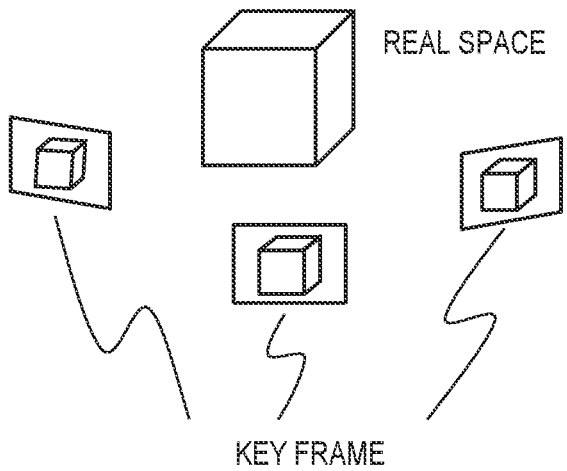
FIG. 3 illustrates a three-dimensional map.

In the method disclosed in Dong, when an image capturing apparatus, at run time, deviates from a range in which position and orientation can be measured in accordance with a three-dimensional map generated in advance, it ceases to be possible to measure the position and orientation with high accuracy.

In one embodiment of the present invention, in position and orientation measurement of the image capturing apparatus based on a captured image, the range in which the position and orientation of the image capturing apparatus can be measured can be expanded while maintaining the measurement accuracy of the position and orientation.

Before each embodiment according to the present invention is described, a hardware configuration capable of realizing the information processing apparatus shown in each embodiment will be described with reference to FIG. 1. FIG. 1 is a hardware configuration diagram of an information processing apparatus according to an embodiment. In FIG. 1, a CPU 10 controls each unit connected to a bus 60 via the bus 60. An input I/F 40 obtains an input signal in a format that can be processed by the information processing apparatus 1 from an external apparatus such as a display apparatus or an operation apparatus. An output I/F 50 also outputs an output signal to an external apparatus, such as a display apparatus, in a form that can be processed by the external apparatus.

A program for realizing the functions of each embodiment can be stored in a storage medium such as a read-only memory (ROM) 20. The ROM 20 may also store an operating system (OS) and device drivers. A memory, such as a random access memory (RAM) 30, may temporarily store these programs. It is possible to realize the functionality of each embodiment by the CPU 10 executing a program stored in the RAM 30 to execute processing according to flowcharts described later. However, instead of the software processing using the CPU 10, the functions of each embodiment can be realized by using hardware having arithmetic units or circuits corresponding to the processing of the respective functional units.

In the embodiment exemplified below, the information processing apparatus obtains an image from an image capturing apparatus and performs processing. In these embodiments, the image capturing apparatus is assumed to be a monocular camera. Further, it is assumed that the image capturing apparatus captures a grayscale image. However, the type of the image capturing apparatus is not limited to this. The image capturing apparatus is not fixed but can move, and can obtain a captured image of an object in the scene where the image capturing apparatus moves around. Hereinafter, a three-dimensional coordinate system in which the optical center of the image capturing apparatus is the origin, the optical axis direction is the Z-axis, the horizontal direction of the image is the X-axis, and the vertical direction of the image is the Y-axis is defined as an image capturing apparatus coordinate system or a capturing coordinate system. The position and orientation of the image capturing apparatus (for example, the position of the origin and the direction of the Z axis) represents the position and orientation of the capturing coordinate system with respect to a reference coordinate system (hereinafter, referred to as a world coordinate system) defined in a space (scene) where capturing is performed. The position and orientation of the image capturing apparatus have six degrees of freedom: three degrees of freedom in position and three degrees of freedom in orientation. In the following description, a physical object existing in a scene is referred to as an object. The type of the object is not particularly limited, and may be, for example, a building, a room, or the like.

First Embodiment

In a first embodiment, correction of a three-dimensional map of a scene is performed by increasing a reliability degree of a previously generated portion of the three-dimensional map and decreasing the reliability degree of a portion expanded at run time.

FIG. 2 shows a configuration of the information processing apparatus 1 according to the present embodiment. The information processing apparatus 1 includes a holding unit 110, an input unit 120, a deriving unit 130, a generation unit 140, a setting unit 150, and a correction unit 160. The input unit 120 is connected to an image capturing apparatus 170.

The holding unit 110 holds a three-dimensional map of a scene which is used by the deriving unit 130 to derive the position and orientation of the image capturing apparatus 170. In the present embodiment, the three-dimensional map includes information indicating a three-dimensional position of a feature of an object. In one embodiment, the three-dimensional map includes information indicating a result of observing an object at each of a plurality of viewpoints. The holding unit 110 can hold a three-dimensional map that was generated in advance, and can sequentially hold three-dimensional maps that are generated and corrected at run time.

FIG. 3 is a diagram illustrating an example of a three-dimensional map. The three-dimensional map of the scene shown in FIG. 3 includes a set of key frames. Key frames refer to captured images captured by an image capturing apparatus at various locations in a scene. A key frame has information indicating a result of observing the object at various viewpoints. For example, from a key frame, the position of a feature can be obtained by a feature extraction process, and the luminance or color information for a specific image position can be obtained.

The three-dimensional map of FIG. 3 includes the position and orientation (hereinafter referred to as the "position and orientation of the key frame") of the image capturing apparatus (i.e., the viewpoint) in the world coordinate system at the time of key frame capturing. Furthermore, the three-dimensional map includes image coordinates (u, v) of features (feature points in the present embodiment) in the key frame and a depth d (z coordinate in the capturing coordinate system of the key frame) that is based on the capturing coordinate system of the key frame. These pieces of information represent information indicating the three-dimensional position of features of the object. In this embodiment, by a known method (e.g., C. Forster, M. Pizzoli, and D. Scaramuzza, "SVO: fast semi-direct monocular visual odometry," Proc. 2014 IEEE International Conference on Robotics and Automation (ICRA), pp. 15-22, 2014.), the three-dimensional coordinates of a feature point in the capturing coordinate system are calculated from the image coordinates (u, v) and the depth d of the feature point. The three-dimensional coordinates of the feature points thus calculated are used for position and orientation measurement of the image capturing apparatus 170, which will be described later.

In the present embodiment, the holding unit 110 holds, as a three-dimensional map, key frames, the positions and orientations for the key frames and three-dimensional information of geometric features in the key frames. Such a three-dimensional map can be generated using known techniques. In the present embodiment, the three-dimensional map of the scene is generated in advance. The holding unit 110 can obtain a three-dimensional map that was generated in advance and stored in a storage unit (not shown). Hereinafter, a portion generated in advance in the three-dimensional map is referred to as a "pre-map". That is, the pre-map includes pre-generated information indicating the three-dimensional position of a feature, sometimes referred to as a first feature. Meanwhile, information indicating the three-dimensional position of a feature, which may be referred to as a second feature, is added to the three-dimensional map by the generation unit 140, which will be described later.

In the case of the present embodiment, the pre-map includes information on a plurality of key frames generated in advance, the position and orientation for each key frame, and the feature points in each key frame. Here, the feature point information includes the feature point image coordinates (u, v) in the key frame and the depth d of the feature point. On the other hand, in the present embodiment, the three-dimensional map is expanded at run-time (when the position of the image capturing apparatus 170 is measured by the information processing apparatus 1). For example, the three-dimensional map is expanded when there is a possibility that the image capturing apparatus deviates from a range in which the position and orientation can be measured using the pre-map, for example, in accordance with a predetermined condition related to the position and orientation of the image capturing apparatus. That is, a new key frame, a position and orientation of the key frame, and information of feature points in the key frame are added to the three-dimensional map. By such a method, the measurement of the position and orientation of the image capturing apparatus 170 can be continued. For example, when there is an obstacle in the area which is a target of the pre-map generation and the image capturing apparatus 170 avoids this obstacle, the image capturing apparatus 170 may deviate from the range in which the position and orientation can be measured. In addition, when the image capturing apparatus 170 moves outside the range in which the position and orientation can be measured using the pre-map, the image capturing apparatus 170 may deviate from the range in which the position and orientation can be measured.

The input unit 120 obtains a captured image captured by the image capturing apparatus 170 (hereinafter, an input image). The input unit 120 can obtain a video image from the image capturing apparatus 170, and can obtain a time-series image of 30 frames per second, for example. The storage unit (not shown) of the information processing apparatus 1 holds intrinsic parameters (focal length, image center position, lens distortion parameters, and the like) of the image capturing apparatus 170. It is possible to pre-calibrate intrinsic parameters of the image capturing apparatus 170 using a known method (e.g., Z. Zhang, "A flexible new technique for camera calibration," IEEE Trans. on Pattern Analysis and Machine Intelligence, vol. 22, no. 11, pp. 1330-1334, 2000.).

The deriving unit 130 derives the position and orientation of the image capturing apparatus 170 using the input image and the three-dimensional map. The deriving unit 130 derives the position and orientation of the image capturing apparatus 170 at the time of image capturing for each image input from the input unit 120 in time series.

The generation unit 140 adds, to the three-dimensional map, information indicating the three-dimensional position of other features of the object, which are obtained based on the input image and the position and orientation of the image capturing apparatus 170. In this way, the three-dimensional map is expanded. In the present embodiment, the generation unit 140 expands the three-dimensional map by adding a key frame and information (the position and orientation for the key frame and information of a feature point) indicating the three-dimensional position of another feature included in the key frame. For example, the generation unit 140 can add a key frame when there is a possibility that the position of the image capturing apparatus 170 will deviate from a range in which the position and orientation can be measured by an existing three-dimensional map.

The setting unit 150 sets a reliability degree to the information indicating the three-dimensional position of a feature. In the present embodiment, information indicating the three-dimensional position of a feature (first feature) included in the pre-map is given higher reliability degree than information indicating the three-dimensional position of a feature (second feature) added by the generation unit 140. In the present embodiment, the setting unit 150 sets a reliability degree of a key frame included in the three-dimensional map. That is, the setting unit 150 can set the reliability degree of a key frame included in the pre-map to be high and the reliability degree of a key frame added by the generation unit 140 at run time to be low.

The correction unit 160 corrects the information indicating the three-dimensional position of the feature included in the three-dimensional map based on the reliability degree of the information. For example, the correction unit 160 may update information indicating the three-dimensional position of the feature included in the three-dimensional map according to the reliability degree of the information. According to such processing, the correction unit 160 can improve consistency with the three-dimensional map. Such a process is known as optimization of a three-dimensional map (or pose graph). In the present embodiment, the correction unit 160 updates the information indicating the three-dimensional position of the feature by correcting the position and orientation of the key frame so that overall consistency of three-dimensional map can be obtained. The correction unit 160 can perform correction based on the reliability degree of the key frame set by the setting unit 150. In the present embodiment, the correction unit 160 fixes the position and orientation for a key frame with a high reliability degree. For example, the correction unit 160 fixes the position and orientation for a key frame included in the pre-map. Therefore, it is possible to widen the range in which the position and orientation for the image capturing apparatus 170 can be measured, while maintaining the accuracy.

Figure 4:
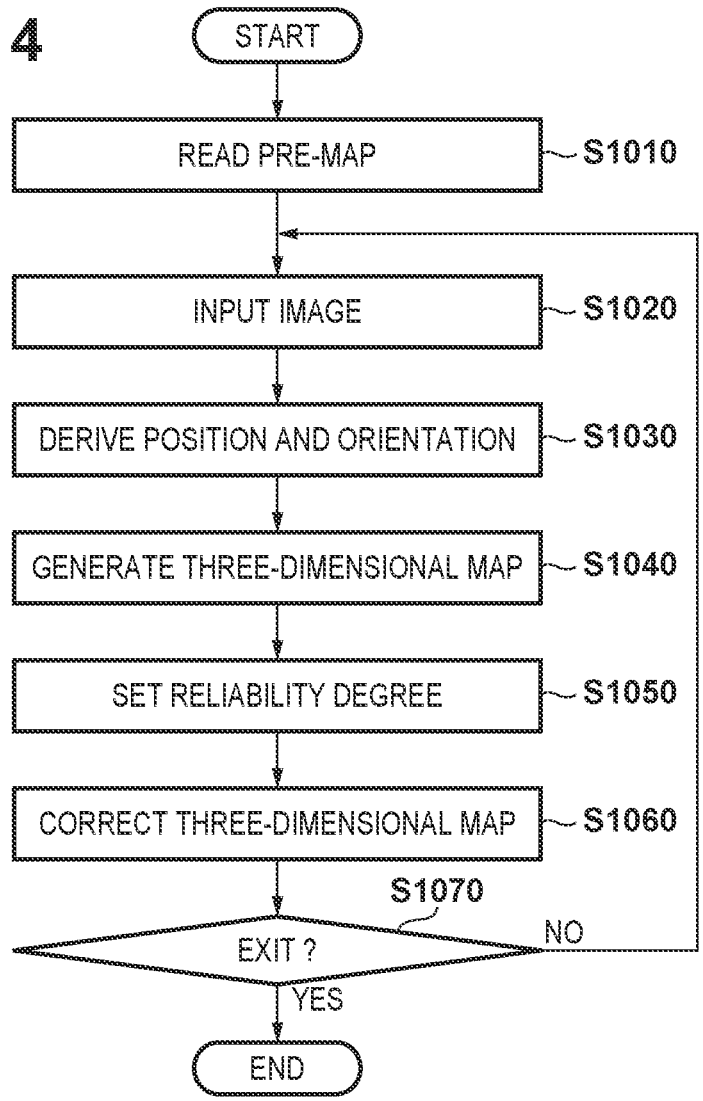
FIG. 4 is an example of a flowchart of an information processing method according to an embodiment.

Next, the processing according to the present embodiment will be described with reference to the flowchart of FIG. 4. In step S1010, the holding unit 110 loads the pre-map from an external storage device (not shown). The method of generating the pre-map is not particularly limited. For example, a pre-map can be generated using a plurality of captured images (key frames) and the position and orientation of the viewpoint of the captured images (position and orientation of the key frames). The image coordinates (u, v) and the depth d of a feature point can be determined by extracting features from the captured images and performing matching between the captured images. Examples of methods for generating a pre-map include a SLAM (Simultaneous Localization and Mapping) technique. In this embodiment, it is possible to generate a pre-map using a method described in J. Engel, T. Schoeps, and. D. Cremers, "LSD-SLAM: Large-scale direct monocular SLAM," Proc. 14th European Conference on Computer Vision (ECCV), pp. 834-849, 2014.

In addition, the holding unit 110 sets a reliability degree $B_i$ (i=1, . . . , Np) of the respective key frames included in the pre-map to HIGH. Here, Np is the number of key frames included in the pre-map.

In the present embodiment, the reliability degree of the key frame is an index indicating whether or not the position and orientation for the key frame is reliable. When the reliability degree of the key frame is high, the correction unit 160 does not correct the position and orientation for the key frame. The position and orientation for a key frame having a high reliability degree is used as a constraint condition for correcting the position and orientation of a key frame having a low reliability degree. A pre-map can be prepared in advance over a sufficient amount of time. For example, a pre-map can be generated in a static state in which a moving physical object, such as a person or vehicle, does not enter the field of view. It is also possible to perform an optimization process whose duration is too long to be performed in real time to generate a pre-map. In this way, it is possible to generate a highly accurate pre-map. Therefore, in the present embodiment, the reliability degree of the key frame included in the pre-map is set to be high (HIGH).

In step S1020, the input unit 120 obtains an input image captured by the image capturing apparatus 170. The input unit 120 can obtain an input image of one frame.

In step S1030, the deriving unit 130 uses the three-dimensional map and the input image held by the holding unit 110 to derive the position and orientation of the image capturing apparatus 170 for when the input image is captured. As the derivation method, various known methods can be used. For example, it is possible to derive a position and orientation for the image capturing apparatus 170 by repeatedly correcting a derived position and orientation so that the difference between 1) an input image feature point image position calculated based on the three-dimensional position and the derived position and orientation of a feature point and 2) the image position of the actually observed feature point on the input image becomes smaller. The relative position and orientation between the key frame and the image capturing apparatus 170 can also be derived so that a color difference, e.g., the luminance difference, between the feature point of the key frame and the corresponding point on the input image corresponding to the feature point that can be determined according to the three-dimensional position of the feature point is smaller. The position and orientation of the image capturing apparatus 170 can be obtained from the relative position and orientation and the position and orientation of the key frame. Here, the three-dimensional position of the feature point can be determined from the position and orientation of the key frame and the information (image coordinates (u, v) and depth d) of the feature point. In the present embodiment, the position and orientation derivation method disclosed by Engel et al. described above is used.

In step S1040, the generation unit 140 generates (expands) a three-dimensional map using the position and orientation of the image capturing apparatus 170 derived in step S1030. The generation unit 140 can expand the three-dimensional map by adding a key frame to the three-dimensional map. In addition, the generation unit 140 can expand the three-dimensional map in response to a predetermined condition being satisfied. Details of this step will be described later. Let Nk be the number of key frames in the three-dimensional map after the key frame is added in this step.

In step S1050, the setting unit 150 sets a reliability degree $B_j$ (j=Nk) of the key frame added to the three-dimensional map in step S1040 to low (LOW). Here, the reliability degree of the key frame refers to the degree of reliability of information stored in the three-dimensional map in association with the key frame, i.e., the position and orientation of the key frame or the information of the feature point in the key frame. At run-time, a key frame reliability degree sometimes is not high because it is difficult to control scene conditions to maintain a static state, e.g., to prevent moving physical objects from entering the field of view. Therefore, in the present embodiment, the reliability degree of a key frame added at run time is set to be low.

In step S1060, the correction unit 160 corrects the three-dimensional map. For example, the correction unit 160 can correct the position and orientation of a key frame included in the three-dimensional map so that the entire three-dimensional map is consistent. Various known methods can be used as the correction method, but in the present embodiment, correction is performed in accordance with the method of Engel et al. described above.

In contrast, in the present embodiment, information indicating the three-dimensional position of a second feature having a second reliability (e.g., LOW) lower than a first reliability (e.g. HIGH) is updated without updating the information indicating the three-dimensional position of the first feature having the first reliability. For example, the position and orientation of a key frame with a reliability degree $B_i$ (i=1, . . . , Nk) set to LOW is a target of correction, and the position and orientation of a key frame with a reliability degree Bi set to HIGH is not a target of correction. In this manner, the correction unit 160 can improve the consistency of the three-dimensional map by updating the information indicating the three-dimensional position of the feature while fixing the information indicating the three-dimensional position of a feature that is generated in advance and has not been generated by the generation unit 140. Therefore, the measurable range of a position and orientation can be expanded without changing the pre-map which was generated with high accuracy. Details of this step will be described later.

In step S1070, the deriving unit 130 determines that the position and orientation measurement is finished. For example, when a termination instruction is input by the user from an input apparatus such as a mouse or a keyboard via the input I/F 40, the measurement of the position and orientation is terminated. If the measurement has not completed, the process returns to step S1020, and measurement of the position and orientation is continued.

(Detail of Step S1040)

In step S1040, the generation unit 140 first determines whether or not to expand the three-dimensional map, that is, whether or not to add a new key frame to the three-dimensional map. Here, the generation unit 140 can make the following determination based on the position and orientation of the image capturing apparatus 170 derived in step S1030.

First, the generation unit 140 selects a key frame in the three-dimensional map (hereinafter, a nearest-neighbor key frame or simply a neighboring key frame) based on the derived position and orientation of the image capturing apparatus 170. For example, the generation unit 140 can select a neighboring key frame according to a predetermined condition based on the derived position and optical axis direction of the image capturing apparatus 170 (the Z-axis direction of the capturing coordinate system in the world coordinate system) and the position and optical axis direction of the key frame. The generation unit 140 can select a key frame having a position close to the image capturing apparatus 170 and a optical axis direction as a neighboring key frame. As an example, the generation unit 140 can select a key frame group from the three-dimensional map based on the optical axis direction of the image capturing apparatus 170. Here, an angular difference between the optical axis direction of the image capturing apparatus 170 and the optical axis direction of the selected key frame group in the world coordinate system is within a threshold Tv. Next, the generation unit 140 selects a neighboring key frame from the key frame group. Here, the position of the selected neighboring key frame among the key frames included in the key frame group is closest to the position of the image capturing apparatus 170.

Next, it is determined whether or not to add a new key frame based on the number of feature points of the neighboring key frame included in the input image obtained in step S1020. For example, the generation unit 140 calculates the image coordinates of each feature point of the neighboring key frame on the input image obtained in step S1020.

For example, in order to calculate the image coordinates, the generation unit 140 first calculates three-dimensional coordinates $X_{Key}$ of a feature point in the capturing coordinate system of the neighboring key frame by the above-described methods. Next, the generation unit 140 uses the position and orientation of the neighboring key frame and the position and orientation of the image capturing apparatus 170 to convert three-dimensional coordinates $X_{Key}$ into three-dimensional coordinates $X_{Cam}$ in the capturing coordinate system of the image capturing apparatus 170 at the time of capturing an input image. Finally, the generation unit 140 converts the three-dimensional coordinates $X_{Cam}$ into image coordinates (u, v) of the input image using the intrinsic parameters of the image capturing apparatus 170. In this manner, the generation unit 140 can obtain a ratio $R_{inc}$ of the feature points for which the calculated image coordinates are included in the input image. When $R_{inc}$ is small, there is a possibility that the image capturing apparatus has deviated from the position and orientation measurement range because the nearest-neighbor key frame and the input image overlap little. Therefore, when $R_{inc}$ is less than the threshold $T_{inc}$, the generation unit 140 determines to add a new key frame.

When it is determined that a new key frame is to be added, the generation unit 140 adds the input image as a new key frame by using the methods of Engel et al. described above. When using the method of Engel et al., feature point information for a new key frame can be generated by projecting and propagating feature point information on the immediately previous key frame (or on a neighboring key frame) onto the input image. For example, by obtaining the three-dimensional coordinates of the feature points from the information of the feature points of the neighboring key frames and projecting the three-dimensional coordinates to the input image, the image coordinates (u, v) and the depth d of the feature points of the new key frame can be determined.

On the other hand, if it is not determined that a new key frame is to be added, the generation unit 140 can update the information (image coordinates (u, v) and depth d) of the feature point for the key frame generated immediately previously. For example, the generation unit 140 can add new feature point information or update depth d information by extracting features from captured image and matching captured images. This process can be performed, for example, using the methods of Engel et al. described above.

(Detail of Step S1060)

FIG. 5 is a flow chart showing a sequence of processing for correcting the three-dimensional map in step S1060. In the optimization process, generally, the information indicating the three-dimensional position of the feature is updated so that the error between the observation result observed at the viewpoint (position and orientation of the key frame) when the feature is at the three-dimensional position and the observation result actually observed at the viewpoint becomes smaller. In the present embodiment, the information indicating the three-dimensional position of the feature is updated so that the error between the color information of the feature and the color information observed for the three-dimensional position at the viewpoint becomes smaller. Specifically, the color information and the three-dimensional position information of the feature point are obtained from the existing key frame. The color information of the observed feature point is also obtained at the corresponding point on the new key frame, which can be determined according to the three-dimensional position of the feature point. Then, the relative positions and orientations of the existing key frame and the new key frame are calculated so that a color difference (for example a luminance difference) of the feature points in the existing key frame and the new key frame becomes smaller. After performing the processing as in steps S1210 to S1220, in step S1230, the position and orientation information of the new key frame (and possibly the existing key frame) is updated to fit the relative position and orientation information. Hereinafter, the process of step S1060 will be described in detail.

In step S1210, the correction unit 160 searches for an existing key frame whose position and orientation is close to the key frame newly added in step S1040 (hereinafter, a new key frame). For example, the correction unit 160 can select all the key frames in which the angular difference in the optical axis direction (Z-axis of the capturing coordinate system) in the world coordinate system is within the threshold $T_{Angle}$ and the difference in position is within the threshold $T_{Dist}$ with respect to the new key frame. Next, the correction unit 160 derives the relative position and orientation between the key frames. Specifically, the correction unit 160 calculates the relative position and orientation between the selected key frame and the new key frame by a similar method to that in step S1030. The obtained relative position and orientation can be stored in the holding unit 110 as key frame correspondence information.

In step S1220, the correction unit 160 searches for an existing key frame having a higher degree of similarity of images with respect to the new key frame. For example, the correction unit 160 selects an existing key frame such that the SSD (Sum of Squared Distance) of the luminance value between the new key frame and the existing key frame is smallest and is also less than or equal to the threshold TSSD, from among the existing key frames. Then, the correction unit 160 calculates the relative position and orientation between the selected key frame and the new key frame similarly to S1210. The obtained relative position and orientation can be stored in the holding unit 110 as key frame correspondence information.

In step S1230, the correction unit 160 corrects the position and orientation of the key frame using the key frame correspondence information obtained in steps S1210 and S1220. Thus, the correction unit 160 corrects the three-dimensional map. In this step, only the position and orientation of a key frame whose reliability degree is set to LOW is corrected, and the position and orientation of a key frame whose reliability degree is set to HIGH is not corrected.

For correcting the position and orientation, it is possible to use the error between the relative position and orientation between the key frames calculated from the position and orientation in the world coordinate system that the key frames have as attributes, and the relative position and orientation between the key frames calculated in steps S1210 and S1220. In this case, it is possible to use a sum of the errors of the relative positions and orientations as an evaluation function. In this manner, the position and orientation of the key frames included in the three-dimensional map are updated so as to reflect the relative position and orientation calculated in steps S1210 and S1220 based on the information of the feature points of the key frame.

Here, let M(i) and M(j) be 4×4 matrices representing the positions and orientations of the key frame i and the key frame j in the world coordinate system, respectively. In addition, a 4×4 matrix representing the relative position and orientation between the key frame i and the key frame j is denoted by $M_{rel}(i, j)$. The matrices M(i) and M(j) are matrices for converting a three-dimensional position in the world coordinate system into a three-dimensional position in the capturing coordinate system. The matrix $M_{rel}(i, j)$ is a matrix for converting the three-dimensional position of the key frame j in the capturing coordinate system into the three-dimensional position of the key frame i in the capturing coordinate system. The matrices M(i), M(j) and $M_{rel}(i, j)$ are matrices in which the upper left 3×3 matrix represents the rotational matrix R and the rightmost column represents the parallel translation components t, as shown in the following equation.

$$\begin{bmatrix} R & t \\ 0\ 0\ 0 & 1 \end{bmatrix}$$ [EQUATION 1]

The correction unit 160 corrects M(i) and M(j) so that the following equation (1) is minimized, while the matrix $M_{rel}(i, j)$ being known. In Equation (1), $\|matrix\|_F$ represents a Frobenius norm (the sum of squares of the elements of the matrix). Equation (1) is the sum for key frames having a reliability degree set to LOW, out of all the key frames included in the three-dimensional map. Information of a key frame whose reliability degree is set to HIGH is used for calculation of the relative position and orientation between the key frames, which is required for correcting the position and orientation of the key frame whose reliability degree is set to low.

[EQUATION 2]

$$\Sigma \|M(i) - M_{rel}(i,j) M(j)\|_F \qquad (1)$$

Since M(i) and M(j) are nonlinear conversions, the minimization of Equation (1) can be performed using, for example, a Gauss-Newton method that performs iterative calculations. As the initial values of M(i) and M(j) for the new key frame, the position and orientation derived in the step S1030 can be used. The correction M(i) and M(j) are again stored as attributes of the key frame in the three-dimensional map, and are used as initial values when next correcting the three-dimensional map.

FIGS. 9A and 9B are conceptual diagrams relating to correction of a three-dimensional map. FIG. 9A describes one method. As shown on the left-hand side of FIG. 9A, it is assumed that a pre-map has been generated. When the image capturing apparatus deviates from the range in which the position and orientation can be measured using the pre-map, map data is added as shown in the center of FIG. 9A. Here, processing for ensuring consistency has not been performed. Next, as shown on the right-hand side of FIG. 9A, the position of the features is adjusted based on the whole of the pre-map and the expanded map. Features in the pre-map are also positionally adjusted, thereby reducing the accuracy of the pre-map. In the present embodiment, as shown in FIG. 9B, since the reliability degree of the position of a feature is high in a map generated in advance, the degree to which a feature is fixed is increased. In contrast, since the reliability degree of the position of the feature is low in the map added at run-time, the degree of fixing of the feature is lowered. That is, consistency can be obtained while maintaining accuracy.

As described above, in the first embodiment, the correction of the three-dimensional map is performed by increasing the reliability degree of a portion generated in advance in the three-dimensional map. For this reason, it is possible to widen the range in which it is possible to measure the position and orientation of the image capturing apparatus, while maintaining the accuracy of the portion of the three-dimensional map that is generated in advance.

(Modification of First Embodiment)

In the first embodiment, the three-dimensional map is a set of key frames. As information indicating the three-dimensional position of a feature, position and orientation information of a viewpoint in a reference coordinate system set in a space where an object is positioned (position and orientation of the key frame), and position information of a feature in the coordinate system with reference to this viewpoint (image coordinates (u, v) and depth d) were used. Then, for each key frame, the image coordinates (u, v) of a feature point and the depth d that is based on the key frame are converted into three-dimensional coordinates in the capturing coordinate system, and the three-dimensional coordinates of the feature point are used for measurement of position and orientation. Further, the correction unit 160 updates the position and orientation information of the viewpoint in the reference coordinate system, i.e., the position and orientation of the key frame, thereby optimizing the three-dimensional map. However, the format of the three-dimensional map is not limited to this. For example, any type of three-dimensional map that enables measurement of the position and orientation of an image capturing apparatus using features on an image can be used.

As an example, the three-dimensional map may include, as information indicating the three-dimensional position of a feature, information indicating the three-dimensional position of the feature (e.g., the three-dimensional coordinates of the feature point) in a reference coordinate system set in the space where the object is positioned. Even if such a three-dimensional map is used, the position and orientation of the image capturing apparatus 170 can be derived using the input image. For example, in the three-dimensional map, the three-dimensional coordinates of a feature point and the image and the position and orientation of each key frame may be recorded. In this case, in step S1030, the deriving unit 130 can determine the position and orientation of an input image so that the error between the position of the feature detected from the input image and the back-projected position of the feature point registered in the three-dimensional map onto the input image becomes smaller, for example. In addition, in step S1040, the generation unit 140 can detect a corresponding feature from an input image and another captured image registered as a key frame (for example, another key frame), determine three-dimensional coordinates of the feature point representing the feature, and register the three-dimensional coordinates in the three-dimensional map. The generation unit 140 can also register the position and orientation of the input image registered as the key frame in the three-dimensional map.

In this instance, the correction unit 160 can update information indicating the three-dimensional position of a feature in the reference coordinate system (e.g., the three-dimensional coordinates of a feature point) in step S1060. For example, the correction unit 160 updates information (the position and orientation of the key frame) indicating the three-dimensional position of a feature so that the error between the direction from the viewpoint (the position and orientation of the key frame) to the three-dimensional position of the feature and the direction (image coordinates) toward the feature observed at the viewpoint becomes smaller. As a specific example, the correction unit 160 can correct the three-dimensional coordinates of a feature point so that the error between the position of a feature detected from the input image and the position of a feature point back-projected to each key frame is smaller, which is generally known as bundle adjustment. In this instance, in step S1050, the setting unit 150 can set the reliability degree of LOW to the three-dimensional coordinates of the feature point newly registered in step S1040. In contrast, the reliability degree of HIGH can be set for feature points registered in the pre-map. The correction unit 160 corrects only the three-dimensional coordinates of the feature point whose reliability degree is set to LOW, and does not correct the three-dimensional coordinates of feature points whose reliability degree is set to HIGH.

The correction unit 160 may correct the position and orientation of the key frame in addition to or instead of the three-dimensional coordinates of the feature point. In this instance, in step S1050, the setting unit 150 can set the reliability degree to LOW for the key frame newly registered in step S1040. On the other hand, the reliability degree of HIGH can be set for the key frames registered in the pre-map. The correction unit 160 corrects only the position and orientation of the key frame whose reliability degree is set to LOW, and does not correct the position and orientation of the key frame whose reliability degree is set to HIGH.

As a method of registering the three-dimensional coordinate of the feature point in the three-dimensional map as described above, for example, the PTAM method of Klein et al. (G. Klein and D. Murray, "Parallel Tracking and Mapping for Small AR Workspaces," Proc. 6th IEEE and ACM International Symposium on Mixed and Augmented Reality, pp. 225-234, 2007.) may be given. In this example, feature points are registered in a three-dimensional map, and the three-dimensional map holds three-dimensional coordinates in a world coordinate system for each feature point. Klein et al. makes the three-dimensional map align overall by correcting the three-dimensional coordinates of the feature points in the world coordinate system by bundle adjustment. When the process according to the present embodiment is performed by applying the methods of Klein et al., the three-dimensional coordinates of the feature points included in the pre-map are fixed, and only the three-dimensional coordinates of the feature points added at run time are corrected in bundle adjustment. According to such a method, it is possible to widen the measurement range of the position and orientation of the image capturing apparatus while maintaining the accuracy of the pre-map.

(Variation of First Embodiment)

In first embodiment, the pre-map was generated by a SLAM technique.

However, the methods of generating the pre-map are not limited to the SLAM technique. Any method for generating a pre-map that is available to derive position and orientation at run-time can be used. For example, a structure from motion technique performed offline based on an image group captured from a plurality of viewpoint positions (e.g., I. Skrypnyk and D. G. Lowe, "Scene modelling, recognition and tracking with invariant image features," Proc. 3rd IEEE and ACM International Symposium on Mixed and Augmented Reality (ISMAR), pp. 110-119, 2004.) may be used to generate a pre-map.

In the first embodiment, the three-dimensional map is generated and the position and orientation of the image capturing apparatus are derived using the method of Engel. However, any method can be used as the method of generating the three-dimensional map and the method of deriving the position and orientation of the image capturing apparatus. For example, as a method of using the feature points held by the three-dimensional map for deriving the position and orientation of the image capturing apparatus, a method of using the feature points explicitly detected from the image as in the method of Skrypnyk et al. described above may be used. The type of feature used is not particularly limited. For example, geometric features such as edges, straight lines, curves, etc. detected from an image may be used as features. Further, as a feature point, a point having a large gradient of the luminance value on the grayscale image of the key frame may be used. The three-dimensional map may include position information (image coordinates (u, v) and depth d) of the features with respect to the feature points or the points constituting the geometric features. Furthermore, the three-dimensional map may include position information (image coordinates (u, v) and depth d) of a feature for all pixels of the key frame. In this manner, any pixel can be treated as a feature point.

Second Embodiment

In the first embodiment, by increasing the reliability degree of a portion generated in advance in the three-dimensional map of the scene, the measurable range of the position and orientation is expanded while maintaining the accuracy of the three-dimensional map. In the second embodiment, a supplemental marker (hereinafter referred to as an assistance marker) for measuring the position and orientation of the image capturing apparatus 170 based on the captured image is arranged in a space (scene) where the object is positioned. This assistance marker is different from features originally present in the scene. The information indicating the three-dimensional position of a feature is given a reliability degree based on the information of the assistance marker. For example, information indicating the three-dimensional position of a feature is given a reliability degree according to the distance from the assistance marker to the feature. As a specific example, features closer to the assistance markers may be given a higher reliability degree than features further away from the assistance markers. In this manner, it is possible to increase the reliability degree of a portion neighboring an assistance marker in the three-dimensional map. By such a method, it is possible to widen the range in which the position and orientation can be measured while maintaining the accuracy of the three-dimensional map.

The configuration and processing of the information processing apparatus according to the present embodiment will be described with reference to FIGS. 1 and 2. The configuration and processing of the information processing apparatus according to the present embodiment are similar to those of the first embodiment, and different portions will be described below.

Figure 7:
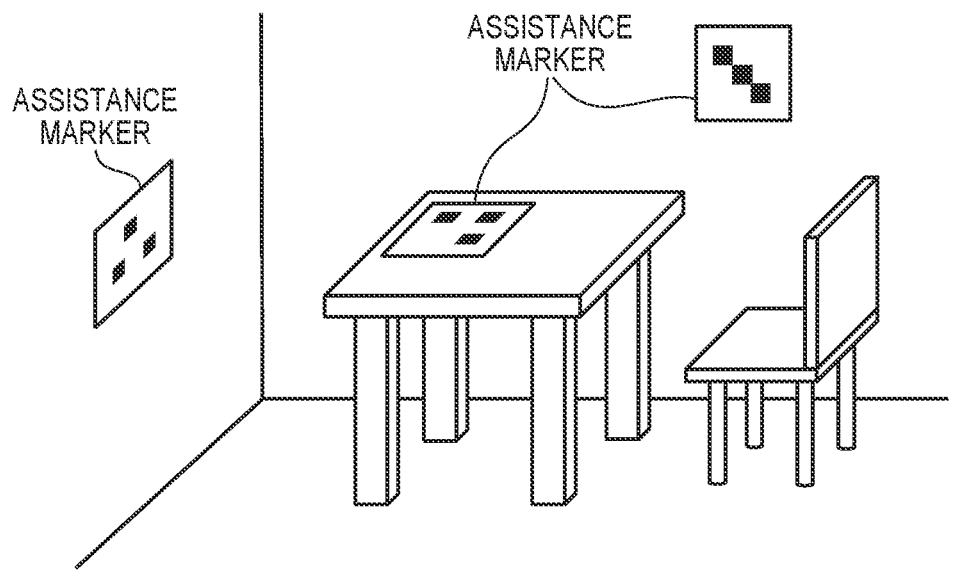
FIG. 7 is a diagram for explaining an assistance marker.

In the present embodiment, the three-dimensional map of the previously generated scene is not used. Instead, as shown in FIG. 7, assistance markers are arranged in a scene. In the present embodiment, an assistance marker having a predetermined shape in which an identifier readable by image analysis is marked is used. In the example of FIG. 7, black and white square marks having individual identifiers therein are arranged as an assistance marker. The arrangement information of the assistance marker, that is, the position and orientation of the assistance marker in the world coordinate system can be calibrated in advance. Calibration methods include, for example, those disclosed in Japanese Patent No. 4532982 or U.S. Pat. No. 7,529,387. The setting unit 150 holds pre-calibrated arrangement information about the assistance marker which is arranged in the scene.

The deriving unit 130 derives the position and orientation of the image capturing apparatus 170 in a similar manner to as in the first embodiment. However, in the present embodiment, since the key frame is not included in the three-dimensional map when activating the information processing apparatus 1, the deriving unit 130 derives the position and orientation of the image capturing apparatus 170 using an assistance marker. For example, the deriving unit 130 can derive the position and orientation of the image capturing apparatus according to the position of an assistance marker detected from the input image and the arrangement information of the assistance marker. In this embodiment, as an example, the method of Kato et al. (H. Kato, M. Billinghurst, I. Poupyrev, K. Imamoto, and K. Tachibana, "Virtual object manipulation on a table-top AR environment," Proc. IEEE and ACM International Symposium on Augmented Reality 2000, pp. 111-119, 2000.) is used.

The setting unit 150 sets the reliability degree to the information indicating the three-dimensional position of the feature as in the first embodiment. In the present embodiment, the setting unit 150 sets a reliability degree based on the number of assistance markers in the captured image (in the input image) with respect to information indicating the three-dimensional position of a feature generated by the generation unit 140 based on the input image. For example, as the number of the assistance markers increases, the accuracy of determination of the position and orientation of the image capturing apparatus 170 increases, which means that the reliability degree of the information (which can be represented by the position and orientation of the key frame and the information of the feature point) indicating the three-dimensional position of the feature also increases. Therefore, when the number of the assistance markers in the input image is greater than or equal to a threshold, it is possible to set a higher degree of reliability for the information indicating the three-dimensional position of the feature as compared with the case where the number of the assistance markers in the input image is smaller than the threshold. In the case of the present embodiment, the setting unit 150 sets the reliability degree of a key frame high when the arrangement information of an assistance marker detected from the key frame is held (that is, when an assistance marker is detected). However, when an assistance marker for which arrangement information is held cannot be detected from a key frame (for example, when an assistance marker is not detected), the setting unit 150 decreases the reliability degree of the key frame.

Similarly to the first embodiment, the correction unit 160 corrects the position and orientation of the key frame based on the reliability degree of the key frame set by the setting unit 150 so as to achieve consistency with the entirety of the three-dimensional map. The position and orientation of a key frame having a high reliability degree are calculated based on the assistance marker by using the method of Kato et al. described above, and fixed at the time of correction by the correction unit 160.

In the present embodiment, the processing of steps S1020 to S1040 and S1070 is similar to that in the first embodiment. Hereinafter, the processing of step S1010, step S1050, and step S1060 will be described.

In step S1010, the setting unit 150 obtains the arrangement information of a pre-calibrated assistance marker from an external storage device (not shown).

In step S1050, the setting unit 150 sets the reliability degree of the key frame added to the three-dimensional map in step S1040. Firstly, the setting unit 150 detects an assistance marker from the added key frame. The detection of an assistance marker can be performed, for example, as follows. First, the setting unit 150 binarizes the key frame, and detects a rectangular area from the binarized image. Next, the setting unit 150 calculates a conversion to make a projection from the rectangular area to a square area based on the image coordinates of each vertex of the rectangular area, and converts the rectangular area to a square area. Further, the setting unit 150 identifies an identifier of an assistance marker by reading a luminance value of an image at the predetermined position of the square area. When the identified identifier is an identifier of an assistance marker for which arrangement information is held, the setting unit 150 determines that the assistance marker is identified in the key frame.

If an assistance marker is not identified in the key frame, the setting unit 150 sets the reliability degree of the key frame to LOW. Further, when an assistance marker is identified in the key frame, the setting unit 150 can set the reliability degree of the key frame to HIGH. However, in the present embodiment, the setting unit 150 can determine an identification state of the assistance marker and set the reliability degree of the key frame according to an index indicating the determination result. For example, the setting unit 150 can set the reliability degree of a key frame to HIGH when an assistance marker is identified in a manner providing high accuracy for example, when a degree of variance of an arrangement of assistance markers in the key frame is equal to or greater than a threshold, and set the reliability degree of the key frame to LOW when the degree of variance of the arrangement of assistance markers in the key frame is less than the threshold.

As an example of such a method, when it is determined that an assistance marker is identified, the setting unit 150 can further calculate a distribution of vertices of the assistance marker in the image. For example, the setting unit 150 may calculate a minimum eigenvalue $\lambda_{min}$ of a covariance matrix of the image coordinates of each vertex of all identified assistance markers as the evaluation value of the distribution of the vertexes of the assistance markers. $\lambda_{min}$ is large when the vertices of the assistance marker are widely distributed on the image, and is small when they are narrowly distributed. When $\lambda_{min}$ is small, the position and orientation of the key frame calculated from the identified assistance marker is susceptible to detection error of the assistance marker, and therefore, the accuracy may be low.

Therefore, when $\lambda_{min}$ is smaller than a threshold $T_\lambda$, the setting unit 150 sets a reliability degree B of the key frame to LOW. In contrast, when $\lambda_{min}$ is large, the position and orientation of the key frame calculated from the identified assistance marker is not easily affected by the detection error of the assistance marker, and therefore it is considered that the accuracy is high. Therefore, when $\lambda_{min}$ is equal to or larger than the threshold $T_\lambda$, the setting unit 150 sets the reliability degree B of the key frame to HIGH.

In step S1060, the correction unit 160 corrects the three-dimensional map by correcting the position and orientation of the key frame to align with the entirety of the three-dimensional map, as in the case of the first embodiment. That is, the correction unit 160 corrects only the position and orientation of key frames whose reliability degree is set to LOW, and does not correct the position and orientation of key frame whose reliability degree is set to HIGH. In this manner, the correction unit 160 fixes information indicating the three-dimensional position of a feature, generated based on an assistance marker arranged in the space in which the object is positioned, for measuring the position and orientation of the image capturing apparatus based on the captured image. By updating the information indicating the three-dimensional position of the feature while performing such fixing, the consistency of the three-dimensional map is improved.

As described above, in the second embodiment, by increasing the reliability degree of the key frame in which the assistance marker is detected, the measurable range of the position and orientation can be widened while maintaining the accuracy. That is, since the position and orientation of a key frame that is determined using an assistance marker is considered to have high accuracy, it is possible to maintain the accuracy by not correcting this position and orientation in the correction of the three-dimensional map.

(Modification of Second Embodiment)

Similar to the modification of the first embodiment, feature points may be registered in a three-dimensional map, and the three-dimensional coordinates of each feature point in the world coordinate system may be held in the three-dimensional map. In this instance, the setting unit 150 may set the reliability degree of the three-dimensional coordinates of a feature point close to an assistance marker to HIGH, and set the reliability degree of other three-dimensional coordinates to LOW. For example, configuration may be taken to calculate the three-dimensional coordinates of feature points close to an assistance marker based on the position and orientation of the image capturing apparatus estimated based on the assistance marker, and when performing bundle adjustment, fix the three-dimensional coordinates of feature points close to the assistance marker, and only correct the three-dimensional coordinates of other feature points. Further, as described above, configuration may be taken to set the reliability degree of a key frame in which an assistance marker is detected to HIGH, and set the reliability degree of other key frames to LOW. That is, configuration may be taken to, when bundle adjustment is performed, fix the position and orientation of key frames in which an assistance marker is detected, and correct only the position and orientation of other key frames. According to such a method, it is possible to expand the measurement range of the position and orientation of the image capturing apparatus while utilizing highly accurate information obtained using the assistance marker.

(Variation of Second Embodiment)

The shape of an assistance marker is not limited to a square (a rectangle). For example, triangular, hexagonal, circular, or elliptical assistance markers may be used. A shape that can be stably detected from an image can be appropriately selected. Further, it is not essential to specify the identifier of the assistance marker from the image. For example, when a circular assistance marker is used, the assistance marker can be identified by calculating a position on the image of the assistance marker based on the position and orientation of the image capturing apparatus to be derived by the deriving unit 130 and associating it with an assistance marker detected in the vicinity of this position. In addition, an assistance marker with an identifier and an assistance marker without an identifier may be used in combination. In this case, a position on the image of the assistance marker without an identifier may be calculated based on the position and orientation of the image capturing apparatus calculated from the assistance marker with the identifier, and be associated with the assistance marker detected in the vicinity.

The calibration of the arrangement information of the assistance markers does not necessarily have to be performed in advance. For example, an image captured by the image capturing apparatus 170 may be used to calibrate arrangement information in parallel with the generation of a three-dimensional map of the scene. In this case, it is possible to prevent the accuracy of the three-dimensional map from decreasing by correcting the three-dimensional map using the assistance marker after the reliability degree of the arrangement information of the assistance marker becomes equal to or higher than the threshold, without first correcting the three-dimensional map. The reliability degree of the arrangement information of the assistance markers can be determined based on, for example, an average value or a minimum value of the number of times each assistance marker is detected in the image group used for the calibration. The larger the average value or minimum value of the number of times of detection, the higher the reliability degree of the arrangement information. As an example, when an assistance marker is detected from a position on an input image corresponding to a three-dimensional position indicated by arrangement information of the assistance marker, it can be determined that the assistance marker is detected.

An index indicating the identification state of an assistance marker is not limited to an evaluation value of the distribution of vertices of the assistance marker or a minimum eigenvalue of the covariance matrix of the image coordinates of the vertices of the assistance marker. For example, the number of assistance markers detected on an image may be used. In this case, the evaluation value can be lowered as the number of detected assistance markers increases. In addition, an index based on both the number of detected assistance markers and the distribution of vertices of the assistance markers may be used.

Various methods can be used as a method of determining the reliability degree. For example, in addition to the method of determining the reliability degree based on whether the assistance marker is detected on the image, the reliability degree may be determined based on whether motion blur is occurring, or whether the whole or part of the image is too bright or too dark. For example, if motion blur is occurring, or if the image is too bright or too dark, the reliability degree of the key frame can be reduced. In the present embodiment, a reliability degree of a three-dimensional map that is generated in advance and a reliability degree based on assistance markers can be used in combination. For example, the reliability degree of a key frame included in the pre-map and the reliability degree of a key frame in which an assistance marker is sufficiently detected can be set to HIGH, and a key frame in which the reliability degree is set to HIGH can be removed from a target of correction.

(Variation Common to First and Second Embodiments)

In the first and second embodiments, the reliability degree of a key frame or a feature point is a binary value of HIGH or LOW. When correcting a three-dimensional map, a reliability degree is used to determine whether or not the position and orientation of a key frame or the three-dimensional position of a feature point is fixed. That is, the three-dimensional position of a feature point or the position and orientation of a key frame having the HIGH reliability degree is fixed, and only the three-dimensional position of a feature point or the position and orientation of a key frame having the LOW reliability degree is corrected. However, the reliability degree of information indicating the three-dimensional position of a feature, such as a key frame or a feature point, is not limited to a binary value, and may be multi-valued or a real number.

In such an example, the correction unit 160 can update information indicating the three-dimensional position of a feature with an update amount corresponding to the reliability degree of information indicating the three-dimensional position of the feature. For example, the correction unit 160 may correct the position and orientation of a key frame or the three-dimensional position of a feature point by using the reliability degree as a weight so that the correction amount becomes smaller when the reliability degree is higher.

In the first and second embodiments, after the three-dimensional map is corrected, derivation of the position and orientation of the image capturing apparatus 170 is performed by obtaining the next input image. However, the timing of correction of the three-dimensional map is not particularly limited. For example, a parallel process for correcting the three-dimensional map may be used in parallel with obtaining the input image and deriving the position and orientation of the image capturing apparatus 170, as with the Engel method or the Klein method described above. In one embodiment, the derivation of the position and orientation of the image capturing apparatus 170 (steps S1020 to S1030), the generation of the key frame (steps S1040 to S1050), and the correction of the three-dimensional map (step S1060) can be performed independently at any time.

Third Embodiment

In the first and second embodiments, when the image capturing apparatus is about to deviate from the measurable range of the position and orientation, a new key frame is added to the three-dimensional map, and correction is performed to achieve alignment with the entirety of the three-dimensional map. In the third embodiment, when the image capturing apparatus is about to deviate from the measurable range of the position and orientation, a temporary map is generated based on an image captured by the image capturing apparatus separately from the pre-map, and the measurement of the position and orientation of the image capturing apparatus is continued. In the present embodiment, measurement of a position and orientation using the temporary map is performed by dead reckoning.

Figure 8:
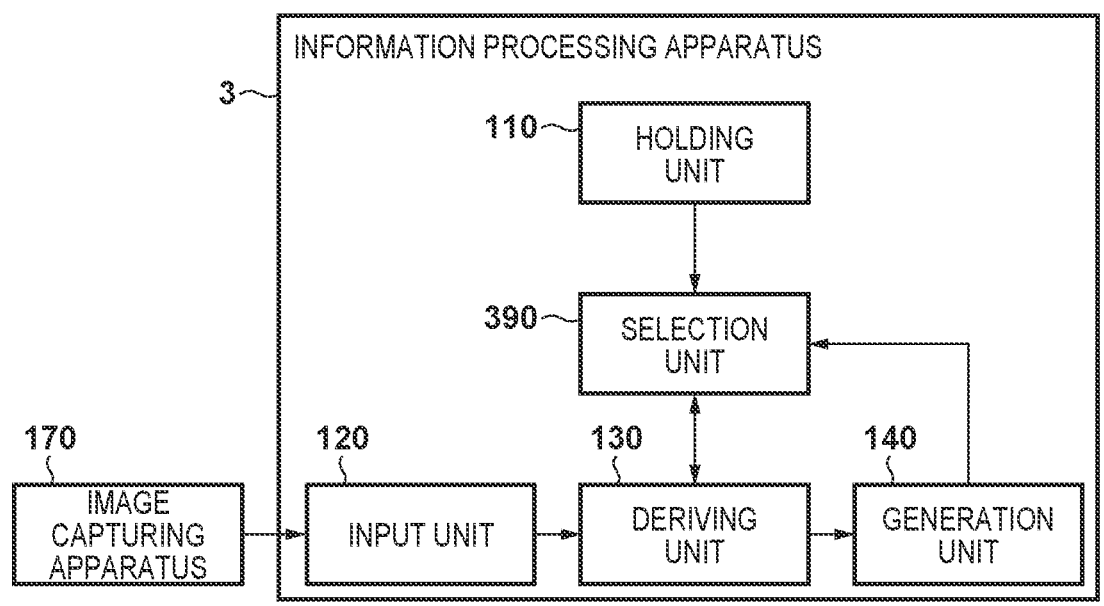
FIG. 8 is a diagram showing an example of the functional configuration of an information processing apparatus 3 according to an embodiment.

The configuration and processing of the information processing apparatus according to the present embodiment will be described with reference to FIGS. 8 and 2. The configuration and processing of the information processing apparatus according to the present embodiment is similar to those of the first embodiment, and different portions will be described below. FIG. 8 shows a functional configuration of the information processing apparatus 3 according to the third embodiment. Similarly to the first embodiment, the information processing apparatus 3 includes a holding unit 110, an input unit 120, a deriving unit 130, and a generation unit 140. The input unit 120 is connected to the image capturing apparatus 170. The information processing apparatus 3 further includes a selection unit 390. The configuration and processing of the information processing apparatus according to the present embodiment are similar to those of the first embodiment, and different portions will be described below.

The holding unit 110 holds a pre-map in the same manner as in the first embodiment, and also holds a temporary map generated at run-time. The selection unit 390 selects a pre-map or a temporary map as a three-dimensional map for deriving the position and orientation of the image capturing apparatus 170 based on the predicted value of the position and orientation of the image capturing apparatus 170. The deriving unit 130 derives the position and orientation of the image capturing apparatus 170 using the input image and the three-dimensional map selected by the selection unit 390. The generation unit 140 generates a temporary map based on the position and orientation of the image capturing apparatus 170 and the input image.

In the present embodiment, the processing of steps S1010 to S1020 and S1070 is similar to that in of the first embodiment. Further, the processing of steps S1050 to S1060 is not performed. Hereinafter, the processing of steps S1030 and S1040 will be described.

In step S1030, the deriving unit 130 derives the position and orientation of the image capturing apparatus 170 using the input image and the pre-map or the temporary map. The process of step S1030 can be performed as follows. First, based on the predicted value of the position and orientation of the image capturing apparatus 170, the selection unit 390 selects a three-dimensional map to be used for deriving the position and orientation of the image capturing apparatus 170. In the present embodiment, the selection unit 390 selects which of the pre-map and the temporary map held in the holding unit 110 is to be used. Details of this processing will be described later.

Next, based on the three-dimensional map and the input image selected by the selection unit 390, the deriving unit 130 derives the position and orientation of the image capturing apparatus 170 at the time of capturing an image. The processing method is not particularly limited, and can be performed in the same manner as in first embodiment. In the present embodiment, as disclosed by Engel et al. described above, a method of deriving a position and orientation using a relative position and orientation between the position and orientation of the image capturing apparatus 170 of the key frame or the previous frame and the position and orientation of the image capturing apparatus 170 of the current frame is used. When a temporary map is used, dead reckoning is performed. That is, the deriving unit 130 calculates the relative position and orientation change of the image capturing apparatus 170 from the previous frame, and combines the position and orientation change with the position and orientation of the previous frame in the world coordinate system to thereby derive the position and orientation of the image capturing apparatus 170 in the world coordinate system of the current frame.

In step S1040, the generation unit 140 generates a temporary map that includes information indicating the three-dimensional position of the features of the object, based on the position and orientation of the image capturing apparatus 170 derived in step S1030 and the input image. Details of this step will be described later.

(Detail of Selecting a Three-Dimensional Map in Step S1030)

The selection unit 390 first selects a neighboring key frame in the pre-map based on the predicted value of the position and orientation of the image capturing apparatus 170. As a predicted value for the position and orientation of the image capturing apparatus 170, for example, the position and orientation derived in the previous step S1030 can be used. The selection of the neighboring key frames can be performed using a similar method to that of step S1040 in the first embodiment. Further, the selection unit 390 determines whether or not the image capturing apparatus 170 has deviated from the position and orientation measurement range. This determination can be made on the basis of the ratio $R_{inc}$ of the feature points of the neighboring key frames included in the input image, similarly to in step S1040 in the first embodiment. When $R_{inc}$ is less than the threshold Tim, the selection unit 390 determines that the image capturing apparatus 170 has deviated from the measurement range of the position and orientation in accordance with the pre-map.

When it is determined that the image capturing apparatus 170 has deviated from the measurement range of the position and orientation in accordance with the pre-map, the selection unit 390 selects a temporary map as a three-dimensional map for use in deriving the position and orientation. When the image capturing apparatus 170 determines that the measurement range of the position and orientation in accordance with the pre-map has not deviated, the selection unit 390 selects the pre-map as a three-dimensional map for use in deriving the position and orientation.

(Details of Step 1040)

In the present embodiment, the generation unit 140 generates a temporary map having information indicating the three-dimensional position of features of the object. The generation of the temporary map can be performed as follows. First, in order to generate a temporary map, the generation unit 140 selects an image $I_{pair}$ that becomes a stereo-pair with the input image $I_{current}$. If a pre-map is selected in step S1030, then a selected neighboring key frame is selected as $I_{pair}$. In contrast, when the temporary map is selected in step S1030, the previous input image is selected as $I_{pair}$. Here, $I_{pair}$ is an input image for which a difference from the image capturing position of $I_{current}$ is equal to or larger than a threshold Tp and a capturing time is closest to $I_{current}$, among the previous input images.

Next, the generation unit 140 searches for feature points on $I_{current}$ that correspond to feature points on $I_{pair}$. In this search, an epipolar line calculated from the position and orientation at the times of capturing of $I_{current}$ and $I_{pair}$ can be considered. For example, the generation unit 140 searches for a position, on the epipolar line on $I_{current}$ corresponding to a feature point on $I_{pair}$, where the difference between luminance values in a window of N×N pixels between $I_{pair}$ and $I_{current}$ is smallest. The generation unit 140 determines the position searched in this way to be the image coordinate on the $I_{current}$ corresponding to the image coordinate of the feature point on the $I_{pair}$.

Next, the generation unit 140 calculates the depths of each feature point in the $I_{current}$ capturing coordinate system by triangulation using an obtained pair of image coordinates. Then, the generation unit 140 temporarily holds the image coordinates (u, v) and the depth d of a feature point group on $I_{current}$ that was obtained in this manner, in the temporary map. Further, the generation unit 140 holds the position and orientation in the world coordinate system when capturing $I_{current}$ as attributes in the temporary map.

The deriving unit 130 can derive a new position and orientation of the image capturing apparatus 170 with respect to the $I_{current}$ capturing coordinate system using the temporary map generated in this manner. Then, the deriving unit 130 can convert the new position and orientation of the image capturing apparatus 170 with respect to the $I_{current}$ capturing coordinate system into the position and orientation in the world coordinate system by using the position and orientation in the world coordinate system at the time of capturing $I_{current}$.

As described above, in the third embodiment, when the image capturing apparatus deviates from the measurable range of position and orientation, measurement of position and orientation is continued by using the temporary map. In this manner, the measurable range can be widened compared to the case where only a pre-map is used. Meanwhile, since the correction of the pre-map is not performed, the accuracy of the pre-map can be maintained.

(Variation of Third Embodiment)

In the third embodiment, a temporary map is generated each time an input image is obtained, regardless of whether the image capturing apparatus 170 will deviate from measurable range or not. However, the timing of generating the temporary map is not limited to this. For example, in step S1040, it is possible to determine whether the image capturing apparatus 170 is in a predetermined range indicating that it is likely to deviate from the measurement range for position and orientation in accordance with the pre-map, using a method similar to step S1030, and based on the position and orientation derived in the immediately previous step S1030. Then, when it is determined that the image capturing apparatus 170 is likely to deviate from the measurement range of the position and orientation based on the pre-map, the generation unit 140 may generate the temporary map.

Further, in step S1040, based on the position and orientation derived in the immediately preceding step S1030, it is possible to determine whether or not the image capturing apparatus 170 has deviated from the measurement range of the position and orientation in accordance with the pre-map by using the same method as in step S1030. Then, when it is determined that the image capturing apparatus 170 has deviated from the measurement range of the position and orientation in accordance with the pre-map, the generation unit 140 can generate the temporary map. In this instance, the selection unit 390 may select a three-dimensional map to be used for deriving the position and orientation of a captured image for a subsequent frame in step S1040 instead of step S1030.

In the third embodiment, a temporary map is used only for deriving the position and orientation of the image capturing apparatus 170 in one frame. However, a temporary map may be used to derive the position and orientation of the image capturing apparatus 170 in a plurality of frames. For example, the holding unit 110 can hold a plurality of temporary maps as three-dimensional maps. Then, when it is determined that the image capturing apparatus 170 has deviated from the measurement range of the position and orientation in accordance with the pre-map, the selection unit 390 can select a temporary map of the neighborhood from the plurality of temporary maps in order to derive the position and orientation. Here, the temporary map in the vicinity can be selected based on, for example, the image capturing position of the image used for generating the temporary map. As an example, it is possible to select a temporary map prepared by using an image whose difference in image capturing position from that of the input image is within a threshold and whose image capturing time is closest to that of the input image. Further, a temporary map may be corrected by using the three-dimensional map correction method described in the first and second embodiments so that alignment between a plurality of temporary maps can be obtained.

In the third embodiment, the position and orientation of the image capturing apparatus 170 derived in the previous frame is used as the predicted value of the position and orientation of the image capturing apparatus 170 in the current frame. However, a method of deriving the predicted value of the position and orientation is not limited to this. For example, the position and orientation of the image capturing apparatus 170 can be predicted using a motion model. As the motion model, for example, a motion model representing uniform motion, uniform accelerated motion, or equiangular velocity movement can be used. By estimating a parameter representing the motion model based on the derivation result of the past position and orientation, the position and orientation in the current frame can be predicted using the motion model. As another method, the position and orientation of the image capturing apparatus 170 in the current frame may be predicted using measured values of a sensor fixed to the image capturing apparatus 170. As the sensor, for example, a sensor that measures a position, a speed, an acceleration, an orientation, or an angular velocity can be used.

Fourth Embodiment

In the first and second embodiments, the measurable range of the position and orientation is expanded while maintaining the accuracy by fixing information indicating the three-dimensional position of a feature to which a high reliability degree is given and updating information indicating the three-dimensional position of a feature to which a low reliability degree is given. In contrast, configuration may be taken to correct the position and orientation of a key frame or the three-dimensional position of a feature point so that the correction amount increases according to the degree of reliability of the information (for example, a key frame or a feature point) indicating the three-dimensional position of the feature.

In the fourth embodiment, information indicating the three-dimensional position of a feature to which a high reliability degree is given is updated, and information indicating the three-dimensional position of a feature to which a low reliability degree is given is excluded from an update target. In the present embodiment, the reliability degree of information indicating the three-dimensional position of a feature on an object whose position changes in the three-dimensional space is set low, and the reliability degree of information indicating the three-dimensional position of a feature on an object whose position does not change is set high. For example, the reliability degree of a key frame indicating a three-dimensional position of a feature on an object whose position changes in a three-dimensional space or a feature point on an object whose position changes in a three-dimensional space can be set low, and the reliability degree of other key frames or feature points can be set to be high. According to such a configuration, it is possible to suppress the deterioration of the accuracy of the three-dimensional map due to the presence of a feature whose position changes.

The hardware configuration of the information processing apparatus according to the fourth embodiment may be similar to that of the first embodiment. The processing in the fourth embodiment is similar to that in the first embodiment, and mainly different points will be described below.

In the present embodiment, the map generation and the position and orientation measurement of the image capturing apparatus are performed simultaneously by using a SLAM technique. It is assumed that, as the SLAM technique, the method of Engel et al. described in the first embodiment is used. Also, when a new key frame is added to the map, the reliability degree of this key frame is set to HIGH. The key frame whose reliability degree is set to HIGH is a target of updating the position and orientation when optimizing the three-dimensional map as in the first embodiment.

As described above, in the present embodiment, it is determined whether or not the position of a feature on the object changes in the three-dimensional space, and the reliability degree of the information indicating the three-dimensional position of a feature determined to change in position is set to be low. As an example, the following method can be used. In the method of Engel et al., position and orientation measurements are performed on a previously added key frame when performing a position and orientation measurement. At this time, it is possible to determine whether or not a feature included in the key frame is on an object whose position changes. As a specific example, a luminance difference between a feature point of a key frame and a corresponding point on an input image corresponding to the feature point is first obtained, and then a ratio Rout of the number of feature points whose luminance difference is equal to or greater than a threshold Tout with respect to the number of feature points of the entire key frame is obtained. When Rout is equal to or larger than a predetermined value, it is determined that the position of the object appearing in the key frame has changed, and the reliability degree of the key frame is changed to LOW. In the present embodiment, a key frame whose reliability degree is set to LOW is excluded from being an update target of optimization of the three-dimensional map. Therefore, it is possible to avoid deterioration in the accuracy of the three-dimensional map due to a change in the position of an object.

(Variation of Fourth Embodiment)

A method of determining whether or not the position of an object appearing in a key frame has changed is not limited to the method described above. For example, this determination may be performed based on the difference between the image coordinates of a feature point of a key frame calculated based on the derived position and orientation of the image capturing apparatus on an input image, and the image coordinates of a corresponding feature point detected on the input image. In addition, the three-dimensional position of a feature point corresponding to the feature point of the key frame may be calculated based on an image captured after the addition of the key frame, and this determination may be performed based on the difference between the calculated three-dimensional position and the three-dimensional position registered in the key frame.

In the present embodiment, the reliability degree of a feature whose position changes is set low. However, the setting of the reliability degree is not necessarily based on a change in position. For example, the reliability degree may be set based on a change in illumination. In this case, it is possible to compare average luminance values between the input image and a key frame whose position or direction of the optical axis is close to the input image, and, when the difference is large, set the reliability degree of the key frame to LOW. According to such a configuration, it is possible to prevent deterioration of map accuracy due to illumination change.

[Example User Interface for Embodiments]

FIG. 6 shows an example of a GUI (a window) for presenting a three-dimensional map generated according to the first embodiment to a user. In this window, a three-dimensional map of a scene is displayed. In the example of FIG. 6, the feature points of the three-dimensional map when viewed from a predetermined virtual viewpoint are displayed. This viewpoint can be arbitrarily selected, for example, in accordance with a user instruction or the like. In this window, an object representing a key frame and an object representing a current image capturing apparatus are drawn. In the present embodiment, feature points are represented by round points, and the positions and orientations of the key frame and the image capturing apparatus are represented by square pyramid-shaped objects simulating a camera.

In this embodiment, the user can change the position, orientation, or intrinsic parameters of the virtual viewpoint using an input device such as a mouse or a trackball. In this way, the user can observe and confirm the three-dimensional map and the current position and orientation of the image capturing apparatus from various viewpoints.

In the present embodiment, key frames or feature points are displayed with different appearances depending on the degree of reliability. For example, in this GUI, the key frames included in the pre-map and the key frames added at run-time can be represented by objects having different appearances. As described above, by changing the method of drawing these key frames, it becomes easy to confirm whether or not the image capturing apparatus is within a range in which the position and orientation can be measured using the pre-map. In FIG. 6, a key frame included in the pre-map is represented by a solid-line square shape, and a key frame added at run-time is represented by a broken-line square shape. Similarly, feature points included in the pre-map and feature points added at run-time can be represented by objects having different appearances.

[Modifications of Embodiments]

In the first and second embodiments, in the three-dimensional map of a scene, the reliability degree of a portion generated in advance or a portion neighboring an assistance marker is set high, and by correcting portions other than these, the range in which position and orientation can be measured is widened while maintaining the accuracy of position and orientation measurement. However, a method of expanding the range in which position and orientation can be measured while maintaining the accuracy of position and orientation measurement is not limited to this. For example, configuration may be taken to fix three-dimensional information of a pre-generated portion of a three-dimensional map of a scene (such as a key frame or a geometric feature), and correct other portions. In addition, the position and orientation of a key frame in which an assistance marker is detected from an image may be derived based on the assistance marker and fixed, and the position and orientation of other key frames may be corrected at the time of three-dimensional map correction. Similarly, the three-dimensional coordinates of a feature point for which three-dimensional coordinates are calculated based on an assistance marker may be fixed, and the three-dimensional coordinates of other feature points may be derived in the three-dimensional map correction.

In each of the above embodiments, the input unit 120 obtains an image captured by the image capturing apparatus 170. However, an image obtained by the input unit 120 is not limited to this. For example, the input unit 120 may obtain an image of a scene captured in advance and stored in a storage device (not shown). In addition, the information processing apparatus according to an embodiment may generate a three-dimensional map of a scene offline, not in real-time, using a structure from motion technique. In this case, the correction unit 160 may read a pre-map, which is a pre-generated three-dimensional map, and perform bundle adjustment while fixing the three-dimensional coordinates of a geometric feature included in the pre-map. Similarly to the second embodiment, when an assistance marker is detected from an image, the correction unit 160 may derive the position and orientation of the image based on the assistance marker, and may perform bundle adjustment while fixing the position and orientation derived based on the assistance marker.

In the above embodiments, the image capturing apparatus 170 is described as a monocular camera. However, the type of the image capturing apparatus 170 is not limited to this. As the image capturing apparatus 170, any image capturing apparatus capable of measuring a position and orientation based on a captured image can be used. For example, the image capturing apparatus 170 may be a stereo/multi-view camera composed of a plurality of cameras, a depth camera, or a combination thereof. Further, the input image is not limited to a grayscale image. For example, the input image may be a color image, a depth image, a combination of a gray image and a depth image, or a combination of a color image and a depth image (RGBD image). The image capturing apparatus 170 may be a three-dimensional measurement device that obtains a three-dimensional image of an object using a method such as LIDAR, and the input unit 120 may obtain measured three-dimensional point cloud information.

For some embodiments, criteria for determining whether to add a new key frame have been described. For example, it is determined whether or not the image capturing apparatus 170 has deviated or is likely to deviate from a measurable range based on a ratio of feature points in a neighboring key frame whose image coordinates are within an input image, and it is determined whether or not to add a key frame based on this determination. However, a determination method is not limited to this. For example, when the difference between the position of the neighboring key frame and the position of the image capturing apparatus 170 in the current frame is larger than a predefined threshold, it may be determined that the image capturing apparatus 170 has deviated from the measurable range. In addition, when the angular difference between the optical axis direction of the neighboring key frame and the optical axis direction of the image capturing apparatus 170 in the current frame is larger than a predefined threshold, it may be determined that the image capturing apparatus 170 has deviated from the measurable range.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising one or more processors and one or more memories storing a program which causes the one or more processors to function as:
    an obtaining unit configured to obtain an image, wherein an image capturing apparatus captures the image while moving;
    an acquisition unit configured to acquire a three-dimensional map, the three-dimensional map having first element information including the image and a first position and orientation of the image capturing apparatus when the image capturing apparatus captured the image; and
    a correction unit configured to correct a second position and orientation of the image capturing apparatus when the image capturing apparatus captured a new image included in a second element information while fixing and not correcting the first position and orientation included in the first element information in a case where a part of feature points derived from the image included in the first element information is common to a part of feature points derived from the new image, wherein the second element information is different from a plurality of pieces of the first element information and the second element information includes the new image and the second position and orientation of the image capturing apparatus.

2. The information processing apparatus according to claim 1, wherein the program further causes the one or more processors to function as a setting unit configured to set a reliability degree to the first position and orientation and the second position and orientation.

3. The information processing apparatus according to claim 2, wherein the setting unit is further configured to set, to the first position and orientation, the reliability degree higher than that to the second position and orientation.

4. The information processing apparatus according to claim 1, wherein the correction unit is further configured to update the three-dimensional map by adding the corrected second position and orientation and the new image.

5. The information processing apparatus according to claim 1, wherein the updating unit is further configured to update the second position and orientation in a reference coordinate system defined in a space where an object is positioned.

6. The information processing apparatus according to claim 1, wherein the reliability indicates a reliability of a position and orientation in relation to a true position and orientation of the image capturing apparatus in a reference coordinate system defined in a space where an object is positioned.

7. The information processing apparatus according to claim 1, wherein the second position and orientation is estimated based on the new image obtained by capturing an object outside a predefined area in the three-dimensional map.

8. The information processing apparatus according to claim 1, wherein the image capturing apparatus is a stereo camera.

9. The information processing apparatus according to claim 8, wherein the updating unit is further configured to fix the first position and orientation and update the second position and orientation such that a reprojection error of the three-dimensional position information of a feature point commonly included in the image captured at the first position and information and the image captured at the second position and orientation is reduced.

10. An information processing apparatus comprising one or more processors and one or more memories storing a program which causes the one or more processors to function as:
   an obtaining unit configured to obtain an image, wherein an image capturing apparatus captures the image while moving;
   an acquisition unit configured to acquire a three-dimensional map, the three-dimensional map having first element information including the image and a first position and orientation of the image capturing apparatus when the image capturing apparatus captured the image; and
   a correction unit configured to correct a second position and orientation of the image capturing apparatus when the image capturing apparatus captured a new image included in a second element information while fixing and not correcting the first position and orientation included in the first element information, such that a reprojection error of three-dimensional position information of a feature point commonly included in the image and the new image is reduced, wherein the second element information is different from a plurality of pieces of the first element information and the second element information includes the new image and the second position and orientation of the image capturing apparatus.

11. The information processing apparatus according to claim 10, wherein the correction unit is further configured to update the three-dimensional map by adding the new image and the corrected second position and orientation.

12. An information processing apparatus comprising one or more processors and one or more memories storing a program which causes the one or more processors to function as:
   an obtaining unit configured to obtain sensing information obtained from sensing of an object by a sensor apparatus while the sensor apparatus moves; and
   an acquisition unit configured to acquire a three-dimensional map, the three-dimensional map having first element information including the sensing information and a first position and orientation of the sensor apparatus when the sensor apparatus sensed the object to obtain the sensing information; and
   a correction unit configured to correct a second position and orientation of the sensor apparatus when the sensor apparatus sensed the object to obtain new sensing information included in a second element information while fixing and not correcting the first position and orientation included in the first element information in a case where a part of feature points derived from the sensing information included in the first element information is common to a part of feature points derived from the new sensing information, wherein the second element information is different from a plurality of pieces of the first element information and the second element information includes the new sensing information and the second position and orientation of the sensor apparatus.

13. The information processing apparatus according to claim 12, wherein the sensor apparatus is a Lidar (Laser imaging detection and ranging) and the sensing information is distance information.

14. A method comprising:
   obtaining an image, wherein an image capturing apparatus captures the image while moving;
   acquiring a three-dimensional map, the three-dimensional map having first element information including the image and a first position and orientation of the image capturing apparatus when the image capturing apparatus captured the image; and
   correcting a second position and orientation of the image capturing apparatus when the image capturing apparatus captured a new image included in a second element information while fixing and not correcting the first position and orientation included in the first element information in a case where a part of feature points derived from the image included in the first element information is common to a part of feature points derived from the new image, wherein the second element information is different from a plurality of pieces of the first element information and the second element information includes the new image and the second position and orientation of the image capturing apparatus.

15. A method comprising:
   obtaining an image, wherein an image capturing apparatus captures the image while moving;
   acquiring a three-dimensional map, the three-dimensional map having first element information including the image and a first position and orientation of the image capturing apparatus when the image capturing apparatus captured the image; and
   correcting a second position and orientation of the image capturing apparatus when the image capturing apparatus captured a new image included in a second element information while fixing and not correcting the first position and orientation included in the first element information, such that a reprojection error of three-dimensional position information of a feature point commonly included in the image and the new image is reduced, wherein the second element information is different from a plurality of pieces of the first element information and the second element information includes the new image and the second position and orientation of the image capturing apparatus.

16. A method comprising:
obtaining sensing information obtained from sensing of an object by a sensor apparatus while the sensor apparatus moves;
acquiring a three-dimensional map, the three-dimensional map having first element information including the sensing information and a first position and orientation of the sensor apparatus when the sensor apparatus sensed the object to obtain the sensing information; and
correcting a second position and orientation of the sensor apparatus when the sensor apparatus sensed the object to obtain new sensing information included in a second element information while fixing and not correcting the first position and orientation included in the first element information in a case where a part of feature points derived from the sensing information included in the first element information is common to a part of feature points derived from the new sensing information, wherein the second element information is different from a plurality of pieces of the first element information and the second element information includes the new sensing information and the second position and orientation of the sensor apparatus.

17. A non-transitory computer-readable medium storing a program which causes a computer to perform:
obtaining an image, wherein an image capturing apparatus captures the image while moving;
acquiring a three-dimensional map, the three-dimensional map having first element information including the image and a first position and orientation of the image capturing apparatus when the image capturing apparatus captured the image; and
correcting a second position and orientation of the image capturing apparatus when the image capturing apparatus captured a new image included in a second element information while fixing and not correcting the first position and orientation included in the first element information in a case where a part of feature points derived from the image included in the first element information is common to a part of feature points derived from the new image, wherein the second element information is different from a plurality of pieces of the first element information and the second element information includes the new image and the second position and orientation of the image capturing apparatus.

* * * * *